United States Patent [19]
Tanaka et al.

[11] Patent Number: 6,039,866
[45] Date of Patent: Mar. 21, 2000

[54] FLUIDIZED BED FILTERING APPARATUS

[75] Inventors: Tetsuya Tanaka, Ibaraki-ken; Koichi Tsuzuki, Tsuchiura; Noriyo Nishijima; Fumitaka Handa, both of Ibaraki-ken; Shiro Nakadaira, Tsuchiura, all of Japan

[73] Assignee: Hitachi, Ltd., Tokyo, Japan

[21] Appl. No.: 09/048,074

[22] Filed: Mar. 26, 1998

[30] Foreign Application Priority Data

Mar. 26, 1997 [JP] Japan .................................. 9-073058

[51] Int. Cl.[7] ....................................................... C02F 3/08
[52] U.S. Cl. .......................... 210/136; 210/150; 210/203; 210/242.1; 210/262; 210/274; 210/284; 210/293
[58] Field of Search ..................................... 210/617, 618, 210/661, 715, 807, 108, 117, 136, 150, 151, 274, 279, 288, 289, 291, 293, 242.1, 203, 262, 284

[56] References Cited

U.S. PATENT DOCUMENTS

| | | | |
|---|---|---|---|
| 3,260,366 | 7/1966 | Duff et al. ................................. | 210/80 |
| 4,140,541 | 2/1979 | Popper ....................................... | 127/55 |
| 4,246,118 | 1/1981 | Tada et al. ................................ | 210/275 |
| 4,276,181 | 6/1981 | Cordier et al. .......................... | 210/741 |
| 4,412,923 | 11/1983 | Capitani et al. ........................ | 210/661 |
| 4,885,083 | 12/1989 | Banks ....................................... | 210/108 |
| 5,066,393 | 11/1991 | Padera et al. ........................... | 210/136 |
| 5,635,080 | 6/1997 | Hensley ................................... | 210/792 |

FOREIGN PATENT DOCUMENTS

| | | |
|---|---|---|
| 3-38289 | 2/1991 | Japan . |
| 9-047772 | 2/1997 | Japan . |

*Primary Examiner*—Peter A. Hruskoci
*Attorney, Agent, or Firm*—Antonelli, Terry, Stout & Kraus, LLP

[57] ABSTRACT

In a fluidized bed filtering apparatus, for preventing particles of filtering material from entering into a feed pipe to clog the feed pipe and lowering the frequency of washing operations, a filtering material layer made of granular filtering material is supported by a supporting layer disposed in a filtering chamber so as to provide a space in the lower portion of the filtering chamber and two lines of a first feed pipe the outlet of which opens in the filtering material layer and a second feed pipe the outlet of which opens within the space are provided for feeding corrupt water into the filtering chamber.

15 Claims, 9 Drawing Sheets

FIG. 12A
FIG. 12B
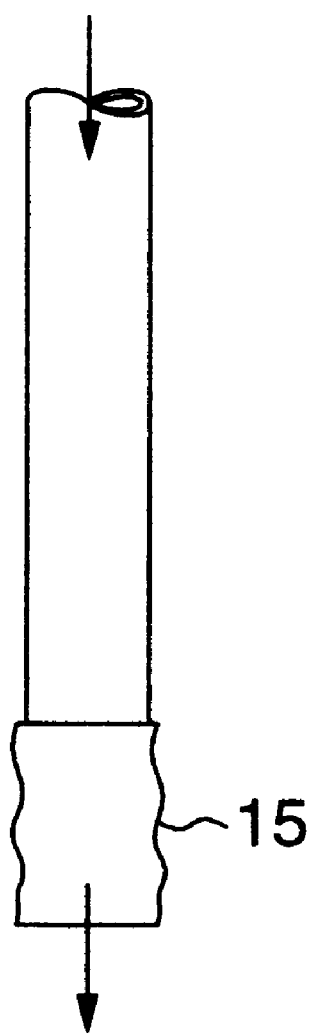
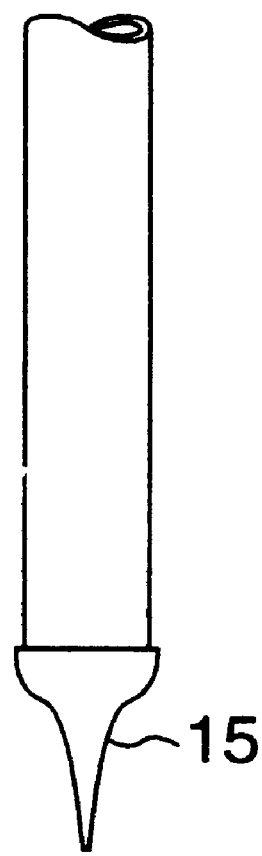

FLUIDIZED BED FILTERING APPARATUS

BACKGROUND OF THE INVENTION

The present invention relates to a fluidized bed filtering apparatus for purifying corrupt water (original water or water to be treated) in a sewer, a drain, a river, a lake, a marsh or the like.

A water treatment method called a contact oxidation method or a dipped filtering bed method is conventionally known for purifying corrupt water in a sewer, a drain, a river, a lake, a marsh or the like. There is a case that this kind of water treatment method is called a biological filtering method or a biological membrane filtering method because an oxidizing and decomposing process by a microorganism makes a great contribution to the purification in particular. In this water treatment method, a filtering chamber is filled with filtering material (contact material) made of a honeycomb tube, a nylon belt, a plastic formed filtering material, charcoal or activated coal, granular filtering material such as ceramics and sand. Corrupt water is passed through the filtering chamber to remove suspension substances (SS) and organic matters in original water.

In the above water treatment method, when the filtering operation continues, autogenous microorganisms in the original water propagates on the surface of the filtering material to form a membrane called a biological membrane, which promotes the removal of corrupt substances.

Filtering methods can be classified into a group of fixed bed and a group of fluidized bed. Filtration by a fluidized bed is performed with filtering material fluidized by the flow of original water. In general, granular filtering material the specific gravity of which is somewhat larger than that of water is used and the original water is passed upward to fluidize the filtering material. In contrast to the filtration with a fixed bed in which clogging is apt to occur near the inlet portion of filtering material in a short operation period because corrupt substances in original water is caught concentrically near the inlet portion, the filtration with a fluidized bed has an advantage that clogging is hard to occur because filtering material is always fluidized.

For instance, the Japanese Patent Unexamined Publication No. 3-38289 is a prior art of fluidized bed filtering apparatus.

In such a prior art fluidized bed filtering apparatus, however, because the outlet of a feed pipe for feeding water to be treated (corrupt water) to a filtering chamber is disposed in a filtering material layer, there is a case that particles of filtering material enter into the feed pipe when suspending the filtering operation, so that the feed pipe is clogged by the filtering material. When once the feed pipe is clogged, there is a case that the filtering material clogging the feed pipe becomes hard to be discharged only with the pressure by a feed water pump. Thus, the restart of the filtering operation becomes hard. It is a problem in the case of suspending the filtering operation for maintenance.

For resolving the above problem, there is another prior art of fluidized bed filtering apparatus in which a filtering material layer is support in the upper portion of a filtering chamber with a gravel layer, a porous plate and others to provide a space in the lower portion of the filtering chamber. The outlet of a feed pipe is disposed within the space. In this construction, filtering material does not enter into the feed pipe but clogging is apt to occur at the portion of the porous plate or the gravel layer because that portion acts as a fixed bed. A washing operation with an air scattering tube or the like provided within the space in the filtering chamber is required when clogging occurs. In this prior art, however, there is a defect that the frequency of the washing operation becomes high. Besides, in such a washing operation, microorganisms which propagated in the filtering material layer and make a great contribution to the purification are also washed away. Thus, a high frequency of washing operations brings upon a considerable decrease of the biological treatment effect.

SUMMARY OF THE INVENTION

Accordingly, it is an object of the present invention to provide a fluidized bed filtering apparatus in which clogging in a pipe with particles of filtering material is prevented so that the suspended filtering operation can easily be restarted and the frequency of washing operation is lowered.

For attaining the above object, a fluidized bed filtering apparatus according to the first aspect of the present invention in which while corrupt water is passed upward through a filtering chamber filled with granular filtering material so that the granular filtering material is fluidized by the flow of the water, the water purifying is performed, comprises a supporting layer disposed in the filtering chamber for supporting a filtering material layer made of the granular filtering material and providing a space in the lower portion of the filtering chamber, a first feed pipe having an outlet within the space for feeding original water to be purified, and a second feed pipe having an outlet in the filtering material layer for feeding original water to be purified.

A fluidized bed filtering apparatus according to the second aspect of the present invention which includes a filtering chamber disposed at a higher level than the surface of an objective water area to be purified, filled with granular filtering material, and having an introducing portion for water to be treated and a draining portion for draining purified water, and a pump (a taking water or feed water pump) provided in the objective water area for taking water to be treated for purification from the water area and feeding the water to the introducing portion of the filtering chamber and in which while corrupt water is passed upward through the filtering chamber so that the granular filtering material is fluidized by the flow of the water, the water purifying operation is performed, comprises a supporting layer disposed in the filtering chamber for supporting a filtering material layer made of the granular filtering material and providing a space in the lower portion of the filtering chamber, a first feed pipe having an outlet within the space for feeding original water to be purified, and a second feed pipe having an outlet in the filtering material layer for feeding original water to be purified, so that the corrupt water is fed into the filtering chamber through plural lines of feed pipes.

The filtering chamber may be disposed so that its lower portion is submerged in the objective water area to be purified.

A feed pipe line for feeding water to be treated into the filtering chamber may be provided in the course of it with means for exposing the water to the atmosphere.

Separate feed water pumps may be provided for the first and second feed pipes, respectively. In that case, it is preferable that a first feed water pump of a high pressure and a little flow type is connected to the first feed pipe and a second feed water pump of a lower pressure and more flow type than the first feed water pump is connected to the second feed pipe.

Otherwise, it is also possible that a pump is connected to the first feed pipe forcedly to feed pressurized water into the space under the supporting layer and the second feed pipe is connected to a head tank so that original water to be purified is fed from the head tank into the filtering material by free fall with gravity.

A multiple-stage fluidized bed filtering apparatus according to the third aspect of the present invention in which plural filtering chambers each filled with granular filtering material for passing corrupt water upward so that the granular filtering material is fluidized by the flow of the water to purify the water are connected in series and water to be treated is passed in order through the plural filtering chambers to be purified, is constructed in the manner that each of the filtering chambers is provided with a supporting layer for supporting a filtering material layer made of the granular filtering material and providing a space in the lower portion of the filtering chamber, the filtering chamber on the first stage is provided with a feed pipe having an outlet within the space, each of the filtering chambers on and after the second stage is provided with a feed pipe having an outlet within the space and another feed pipe having an outlet in the filtering material layer. The filtering chamber on the first stage may be provided with another feed pipe having an outlet in the filtering material layer.

The above fluidized bed filtering apparatus may be constructed in the manner that a head tank is provided at a higher level than the filtering chamber, the first and second feed pipes are connected to the head tank so that original water to be purified is fed from the head tank into the space and the filtering material layer by free fall with gravity, and the second feed pipe is connected to the head tank at a lower portion than the first feed pipe.

The second feed pipe may have a shape in that the flow section in the outlet portion flares toward the tip of the outlet portion. The second feed pipe may have a structure in that the tip of the outlet portion is closed and slits for discharging water to be treated are formed in the pipe wall in the outlet portion. It is also effective that an obstacle plate for preventing filtering material from entering is provided below the outlet of the second feed pipe. At least a portion of the second feed pipe may be made of soft material so that the portion of the soft material is squashed by a hydraulic pressure to close the second feed pipe at that portion when suspending the filtering operation.

In the present invention in which the above two lines of feed pipes are provided, it becomes easy to restart the operation when the apparatus is used in the manner that the corrupt water is fed through the first feed pipe initially when the filtering operation starts or restarts and then the feed pipe line is changed over so that the corrupt water is fed through the second feed pipe.

Air scattering means for washing the filtering material layer may be provided within the space in the filtering chamber. In that case, it is preferable that the second feed pipe is provided with a valve or a check valve. By this construction, when an aeration operation with the air scattering means is carried out in the filtering chamber, the second feed pipe can be closed by the operation of the valve or the check valve to prevent filtering material from entering into the second feed pipe.

Other features, objects and advantages of the present invention will become apparent by the following description with reference to attached drawings.

BRIEF DESCRIPTION OF DRAWINGS

FIGS. 12A and 12B are side views of the outlet portion of still another feed pipe used in the present invention;

DETAILED DESCRIPTION OF PREFERRED EMBODIMENTS

Figure 13:
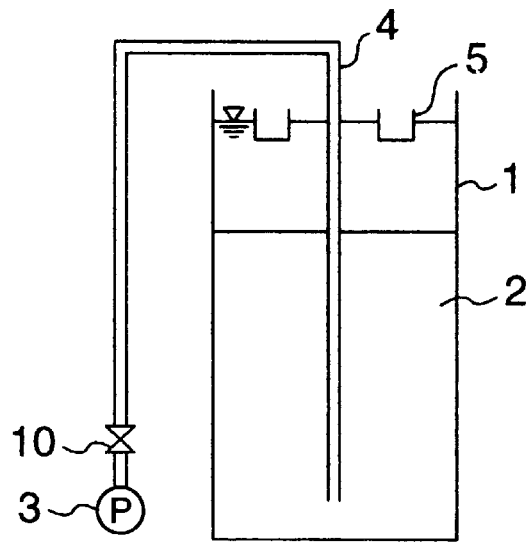
FIG. 13 is a cross-sectional view of a prior art fluidized bed filtering apparatus.

FIG. 13 shows a prior art fluidized bed filtering apparatus. A filtering chamber 1 is filled with fine granular filtering material which forms a filtering material layer 2. Original water is fed through a pump 3 and a feed pipe 4 into the lower portion of the filtering chamber 1. The water is then passed upward through the filtering material layer 2 and discharged as treated water through a launder 5 for discharging treated water. In this construction, because the outlet of the feed pipe 4 is disposed in the filtering material layer 2, there is a case that particles of the filtering material of the filtering material layer 2 enter into the feed pipe 4 to clog the feed pipe 4 when suspending the operation and it becomes hard to discharge the filtering material clogging the feed pipe 4 only with the pressure by the pump 3.

Figure 4:
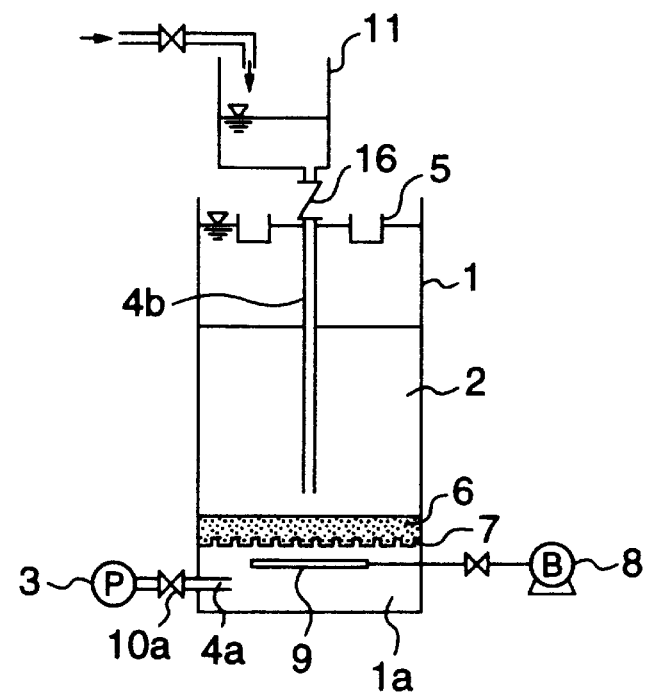
Figure 14:
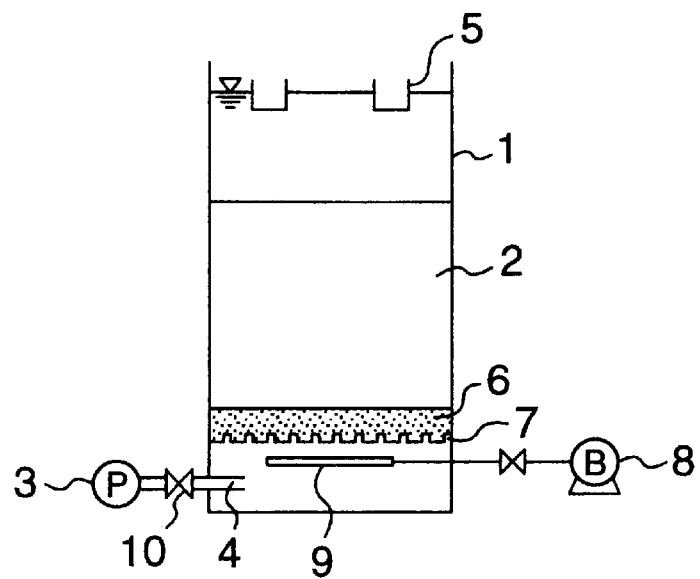
FIG. 14 is a cross-sectional view of another prior art fluidized bed filtering apparatus.

FIG. 14 shows another prior art fluidized bed filtering apparatus. A gravel layer 6 is provided under a filtering material layer 2 for supporting the filtering material layer 2. A porous plate 7 is provided under the gravel layer 6. The filtering material layer 2 is supported in the upper portion of a filtering chamber 1 by the gravel layer 6 and the porous plate 7 so that a space is formed in the lower portion of the filtering chamber 1. An outlet of a feed pipe 4 is disposed within the space. In this construction, filtering material does not enter into the feed pipe 4 but clogging is apt to occur in the portion of the porous plate 7 or the gravel layer 6 because that portion acts as a fixed bed. This fluidized bed filtering apparatus thus loses the advantage in itself that clogging is hard to occur. When clogging occurs, some washing operation must be carried out for removing corrupt substances which clog filtering holes. For this purpose, the apparatus of FIG. 4 is provided with an air scattering tube 9 within the space in the filtering chamber 1. Air is blown out from the air scattering tube 9 into the filtering chamber 1 by a blower 8 to carry out a washing operation. When such a washing operation is carried out, however, microorganisms which propagated in the filtering material layer 2 and make a great contribution to the purification are also washed away. Thus, a high frequency of washing operations brings upon a considerable decrease of the biological treatment effect. For this reason, there is a necessity for extending the interval of washing operations to maintain the biological treatment effect.

Hereinafter, embodiments of the present invention will be described with reference to FIGS. 1 to 12.

Figure 5:
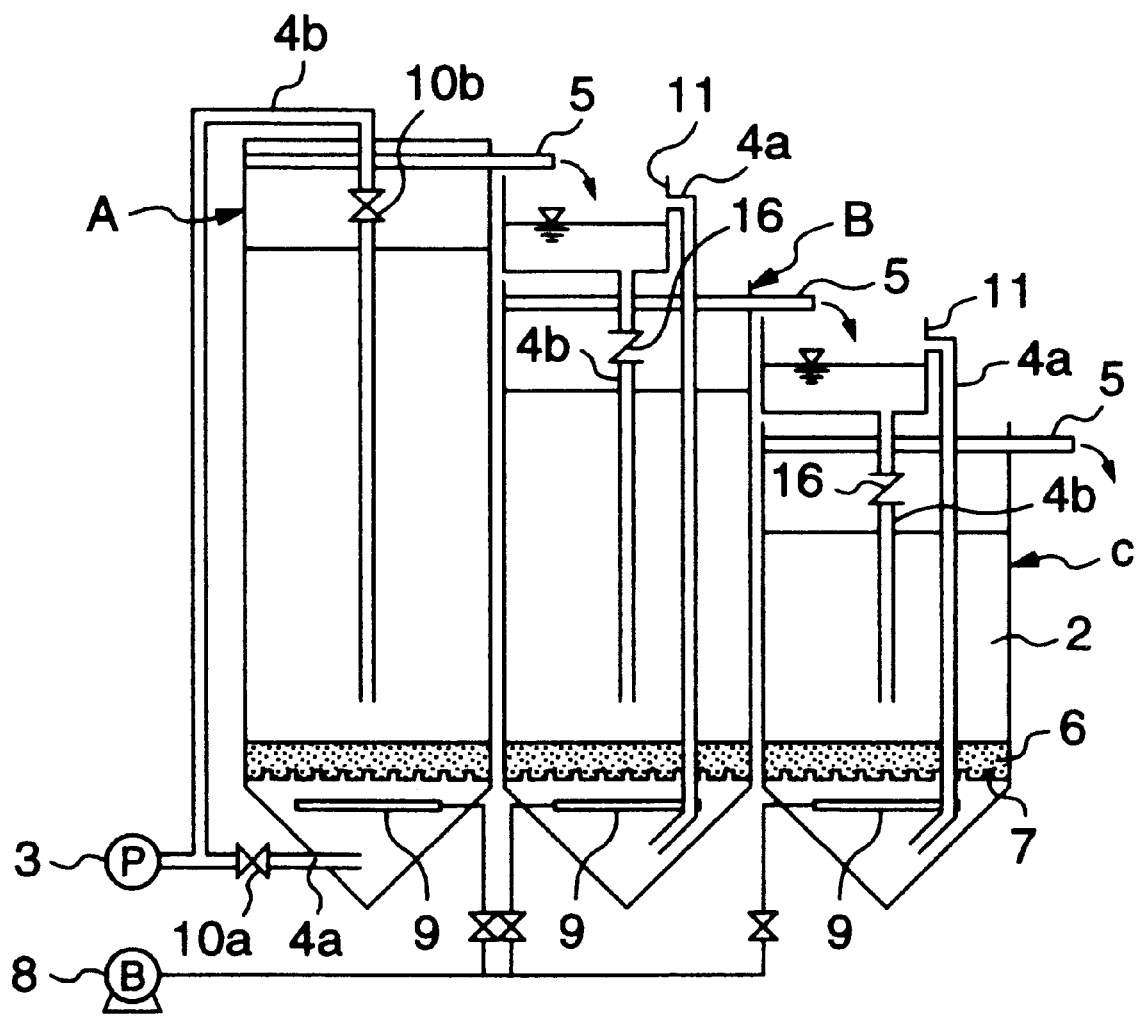
Figure 6:
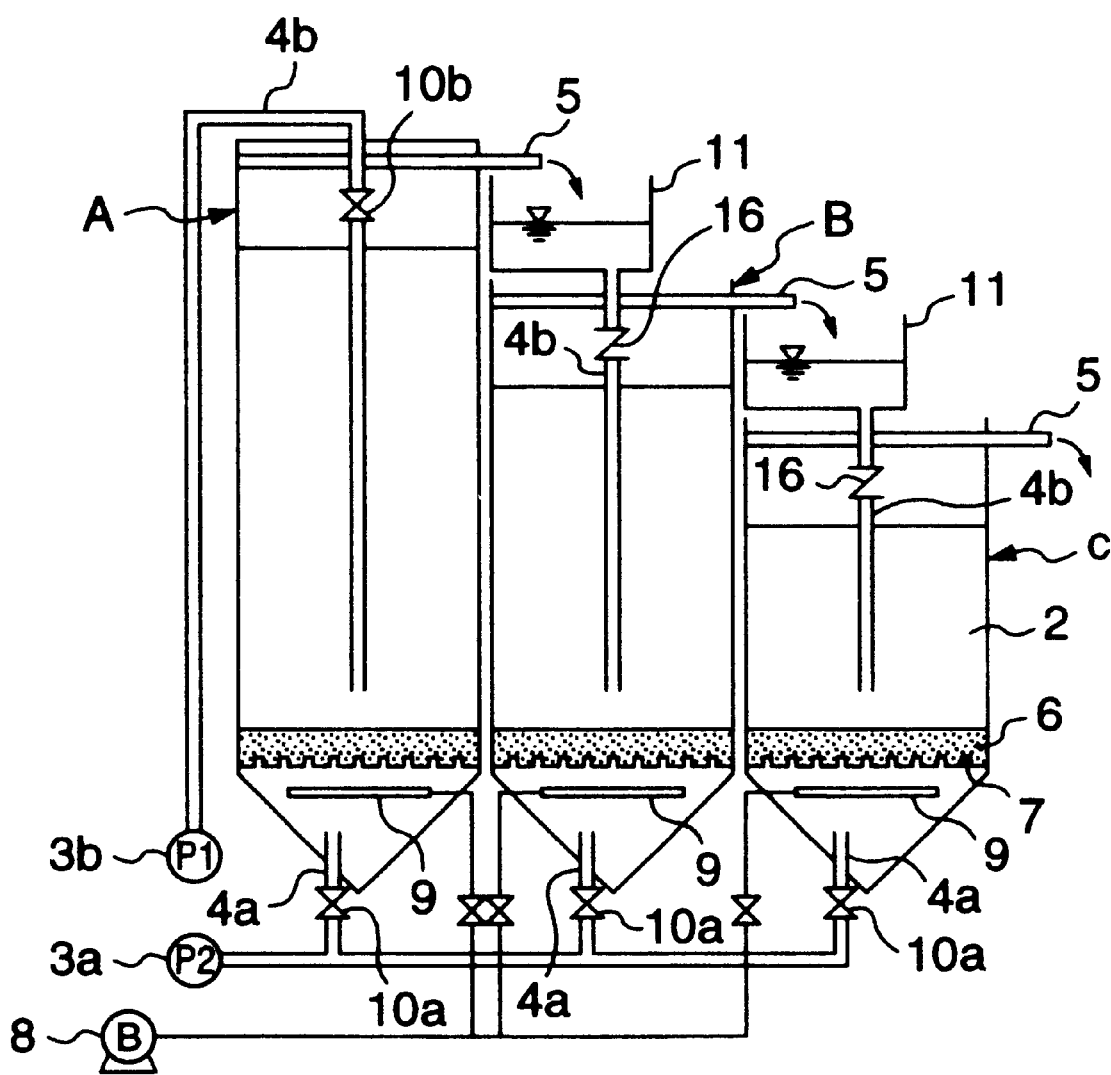
Figure 7:
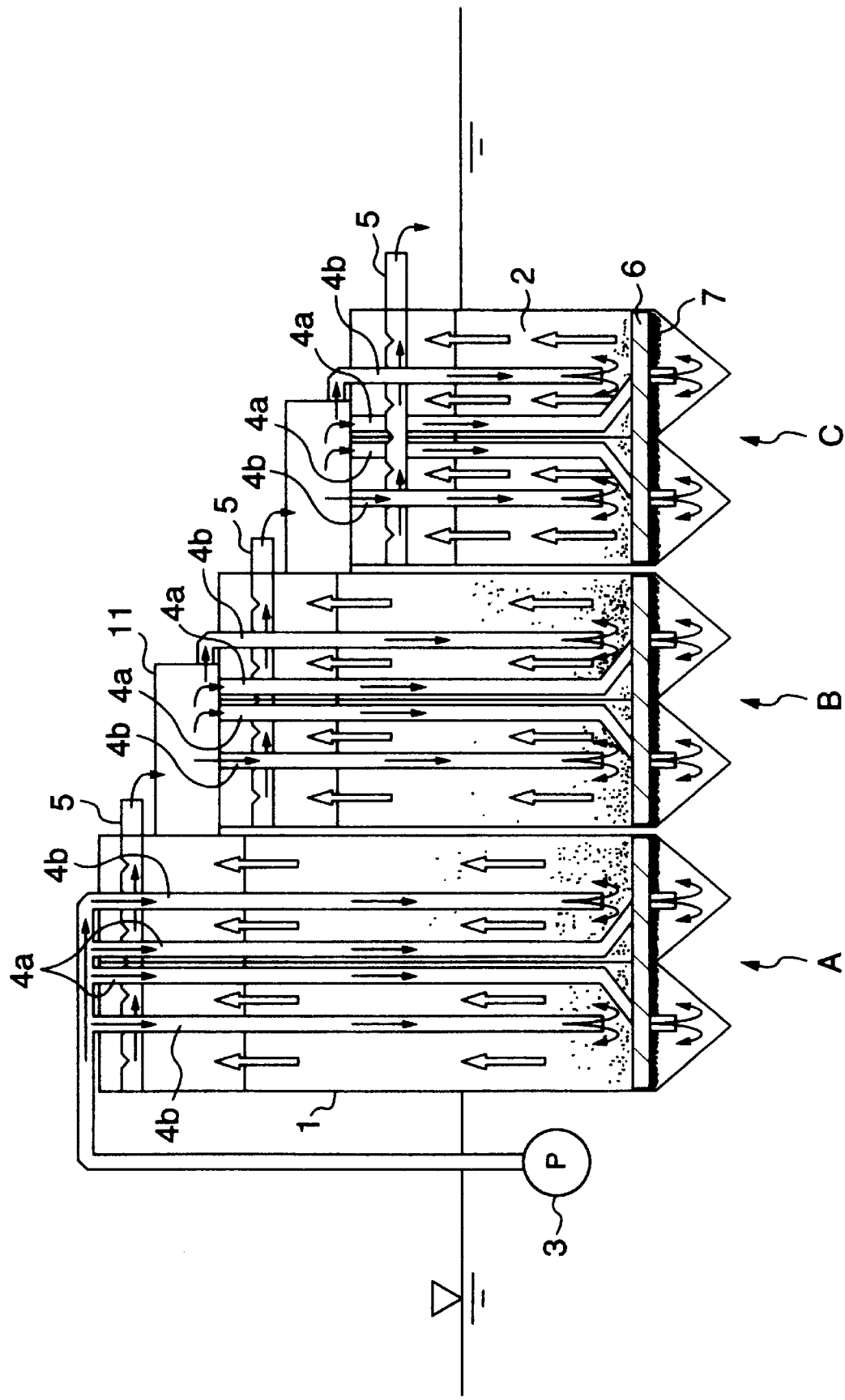

FIGS. 1 to 4 show embodiments of the present invention, respectively. FIGS. 5 to 7 show embodiments of filtering systems in which some of the embodiments of FIGS. 1 to 4 are properly combined, respectively. FIGS. 8 to 12 show structures of the outlet portions of feed pipes.

Figure 1:
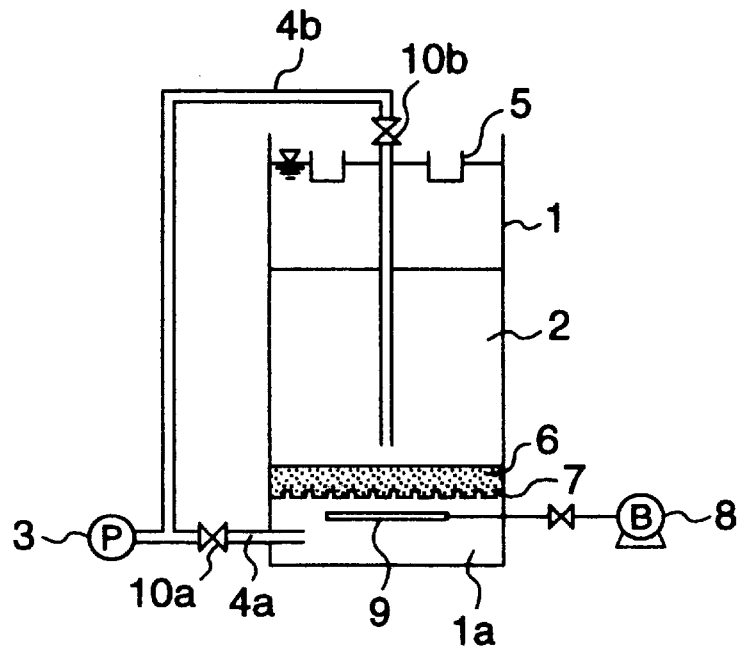
FIG. 1 is a cross-sectional view of an embodiment of a fluidized bed filtering apparatus according to the present invention.

In FIG. 1, a porous plate 7 is provided in the lower portion of a filtering chamber 1. A gravel layer 6 is provided on the porous plate 7. A filtering material layer 2 is provided on a supporting layer formed by the porous plate 7 and the gravel layer 6. For filtering material of which the filtering material layer 2 is made, activated coal, natural mineral matter such as anthracite, cristobalite and zeolite, silicon sand and so on are usable. The particle size of the filtering material is preferably about 1 mm. In accordance with the size and the density of the selected filtering material, the flow rate is properly controlled to fluidize the filtering material layer 2. Two lines of feed pipes are provided for feeding original water into the filtering chamber 1. The outlet of one feed pipe (a first feed pipe) 4a opens within a space 1a formed under the porous plate 7 and the outlet of the other feed pipe (a second feed pipe) 4b opens in the filtering material layer 2. The feed pipes 4a and 4b are provided with valves 10a and 10b, respectively, for changing over the feed pipe line. original water is fed into the filtering chamber 1 with the pressure by a feed water pump (pressurized water feeding means) 3 selectively from the feed pipe 4a or 4b in accordance with the operations of the valves 10a and 10b. The original water then flows in the filtering chamber 1 as an upward stream and is discharged through a launder 5 as treated water. An air scattering tube 9 is provided within the space 1a in the lower portion of the filtering chamber 1 to aerate the interior of the filtering chamber 1 by a blower 8. When clogging of the porous plate 7, the gravel layer 6 or the filtering material layer 2 has occurred, air is blown out from the air scattering tube 9 into the filtering chamber 1 to carry out a washing operation of them.

As described above, the fluidized bed filtering apparatus shown in FIG. 1 is provided with two lines of the feed pipes 4a and 4b. When the feed pipe 4a is used, the original water is passed through the porous plate 7 and the gravel layer 6 so clogging is apt to occur at that portions. Thus, for making the most of the advantage of such a fluidized bed filtering system that clogging is hard to occur, it is preferable to use the feed pipe 4b in the usual filtering operation so that original water is not passed through the porous plate 7 and the gravel layer 6. However, the feed pipe 4b has a possibility that particles of filtering material enter into it when suspending the filtering operation. In that case, there is a fear that the flow resistance in the line of the feed pipe 4b increases and the particles of filtering material which have entered into the feed pipe 4b cannot be discharged from the feed pipe 4b only with the pressure by the pump 3, so that the filtering operation cannot be restarted. For coping with this trouble, first, the valve 10a is opened and the valve 10b is shut so as to use only the feed pipe 4a to feed the original water. Since the outlet of the feed pipe 4a opens within the space 1a in the lower portion of the filtering chamber 1, there is no fear that particles of filtering material enter into the feed pipe 4a. Thus, the original water can easily be fed only with the pressure generated by the pump 3. Thereafter, as the valve 10a is kept open, the valve 10b is also opened. Just then, since the filtering material layer 2 is fluidized and expanded by the flow of the original water from the feed pipe 4a, the density of the particles of filtering material near the outlet of the feed pipe 4b is decreased in comparison with that at the suspension of the filtering operation (at the stationary state of the filtering material). Thus, the flow resistance in the feed pipe 4b becomes small and the particles of the filtering material which have entered into the feed pipe 4b are discharged from the feed pipe 4b, so that water feeding through the feed pipe 4b becomes possible. Thereafter, the valve 10a is shut to change over into the usual filtering operation. By the above operation, the filtering operation can easily be restarted. In the above operation, the feed pipe 4a is used only at restarting. Thus, the original water is not passed through the porous plate 7 and the gravel layer 6 in the usual filtering operation, so that clogging does not occur in the porous plate 7 and the gravel layer 6 for a long duration. As a result, the interval of washing operations can considerably be extended.

When clogging occurs in the porous plate 7, the gravel layer 6 or the filtering material layer 2, air is blown out into the filtering chamber 1 by the blower 8 through the air scattering tube 9 provided in the lower portion of the filtering chamber 1 so as to carry out a washing operation. In such a washing operation, if air enters into the feed pipe 4b to form a reverse flow in the feed pipe 4b, particles of filtering material can be forcedly entered into the feed pipe 4b. Accordingly, when aerating the filtering chamber 1 for a washing operation, the valve 10b is shut to prevent air flow from entering into the feed pipe 4b. By this measure, filtering material is prevented from entering into the feed pipe 4b in a washing operation, so the filtering operation can easily be restarted.

It is possible to omit the valves 10a and 10b. In the usual filtering operation, since the flow resistance in the line of the feed pipe 4b is smaller than that of the feed pipe 4a by the absence of the porous plate 7 and the gravel layer 6, the feed pipe 4b is mainly used without any operation of the valves. Also in the case that the valve 10b is replaced by a check valve, it is possible to prevent air flow from entering into the feed pipe 4b and prevent particles of filtering material from entering into the feed pipe 4b when aerating the filtering chamber 1.

In this embodiment, the filtering material layer 2 is supported at a certain level in the filtering chamber 1 by the porous plate 7 and the gravel layer 6. According to the particle size of filtering material, the filtering material layer 2 may be supported only by the porous plate 7. Furthermore, a porous block, a slit strainer or the like can be used instead of the porous plate 7.

Figure 2:
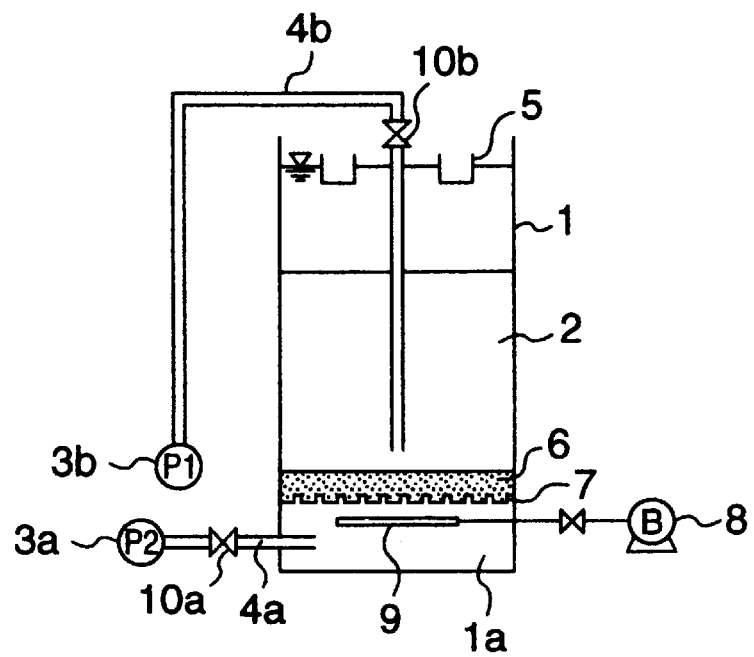
FIG. 2 through FIG. 7 are cross-sectional views of other embodiments of fluidized bed filtering apparatus according to the present invention, respectively.

FIG. 2 shows a modification of the fluidized bed filtering apparatus shown in FIG. 1. In FIG. 2, the same references as those in FIG. 1 represent the parts same as or corresponding to those in FIG. 1. In this embodiment, a first feed water pump 3a and a second feed water pump 3b are connected to the upstream ends of first and second feed pipes 4a and 4b, respectively. In the embodiment shown in FIG. 1, there is a necessity to feed the original water into both feed pipes 4a and 4b by one pump 3 when restarting the filtering operation after a suspension as described above. Thus, the pump 3 requires a large capacity to some extent. In contrast thereto, in this embodiment, since the independent feed water pumps 3a and 3b are connected to the feed pipes 4a and 4b, respectively, the feed water pump 3b is enough to have a capacity corresponding to the usual filtering operation. There is a merit that a large capacity pump needs not always be operated. As a result, a filtering operation with a good efficiency becomes possible.

In this embodiment, when a pump of a high pressure and a little flow type is used for the feed water pump 3a and a pump of a low pressure and a large flow type is used for the feed water pump 3b, the efficiency is further improved. In the usual filtering operation in which the pump 3b and the feed pipe 4b are used, the pressure merely to fluidize the filtering material layer 2 is required. Thus, the pump 3b is enough to be a low pressure type. However, when the pump 3a and the feed pipe 4a are used for restarting the filtering operation, the original water must be passed through the porous plate 7 and the gravel layer 6. Thus, it is preferable to use a pump of a higher pressure type than the pump 3b for the pump 3a.

Figure 3:
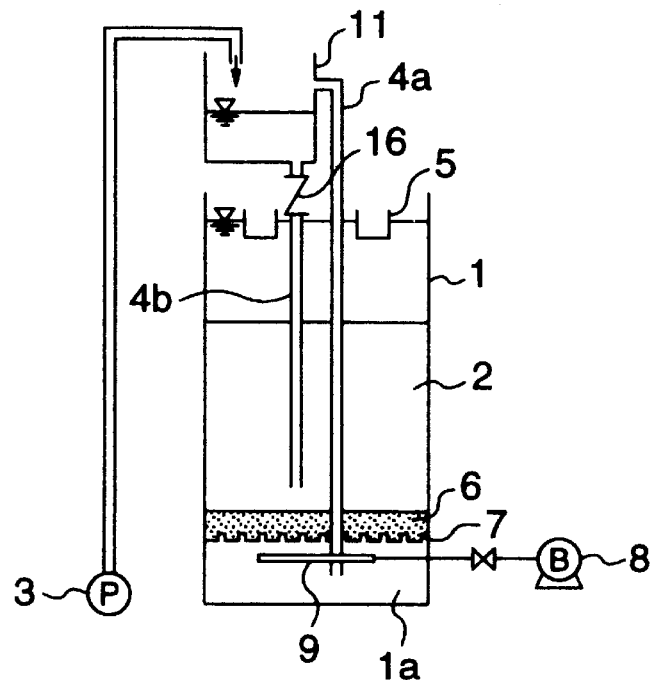

FIG. 3 shows another modification of the apparatus shown in FIG. 1. In this embodiment, a head tank 11 is provided as means for feeding the original water into a filtering chamber 1. The original water pumped up by a pump 3 is once fed into the head tank 11 (means for exposing the water to the atmosphere) and then introduced into the filtering chamber 1 through feed pipe 4a or 4b connected to the head tank 11. The outlets of the feed pipes 4a and 4b open within a space 1a formed under a porous plate 7 and in a filtering material layer 2, respectively, like in the apparatus shown in FIG. 1. These two feed pipes 4a and 4b are connected to the head tank 11 at different levels. The feed pipe 4b used in the usual filtering operation is connected to the head tank 11 at a lower level than the feed pipe 4a. If particles of filtering material have entered into the feed pipe 4b and the flow resistance in the feed pipe 4b is large when restarting the filtering operation, the water level in the head tank 11 ascends. When the water level ascends to the connecting portion to the feed pipe 4a, the original water is fed through the feed pipe 4a into the filtering chamber 1 from below of the porous plate 7. By this operation, since the filtering material layer 2 is fluidized and expanded, the flow resistance in the feed pipe 4b becomes small, so the original water can also flow through the feed pipe 4b. When the filtering operation becomes usual, the water level in the head tank 11 comes back to the original level because the flow resistance in the feed pipe 4b is smaller than that of the feed pipe 4a. Thus, the restart of the filtering operation becomes easy and clogging in the porous plate 7 or the gravel layer 6 is minimized like in the embodiment of FIG. 1. Furthermore, in this embodiment, there is an effect that the lines of feed pipes 4a and 4b can automatically be changed over without the need of valve operation.

The feed pipe 4b is provided with a check valve 16. It is thus possible to prevent air bubbles from entering into the feed pipe 4b and particles of filtering material from entering into the feed pipe 4b when aerating the filtering chamber 1, so the restart of the filtering operation becomes easy.

FIG. 4 shows still another modification of the apparatus shown in FIG. 1. In this embodiment, a feed pipe 4b the outlet of which opens in a filtering material layer 2 is connected to a head tank 11. A feed pipe 4a the outlet of which opens within a space 1a formed under a porous plate 7 is provided with a pump 3a. Water to be treated is fed into the head tank 11 from an upstream side during the usual filtering operation. In the case of feeding water through the feed pipe 4a with the pump 3 when restarting the filtering operation after a suspension, water to be treated may be used or treated water an amount of which was stored in a tank provided in the apparatus may be used. In this embodiment, even when the pressure loss is increased in a porous plate 7 or a gravel layer 6, water can be fed through the feed pipe 4a with the pressure generated by the pump 3. Thus, the feed of water through the feed pipe 4a can be performed more surely. There is an effect that the restart of the filtering operation after a suspension can more smoothly be performed. In the case of purifying river water or water discharged from another purifying system in the preceding stage, the water flow from the upstream side can be introduced as it is into the head tank 11 for purification. Thus, there is no necessity for using a pump during the usual filtering operation, so that the operation is carried out with a good efficiency.

Next, embodiments of system constructions of fluidized bed filtering apparatus some of the fluidized bed filtering apparatus shown in FIGS. 1 to 4 are properly combined will be described with reference to FIGS. 5 to 7.

FIG. 5 shows the first system construction in which three stages of filtering apparatus are connected in series. A filtering apparatus corresponding to FIG. 1 is used for the first stage and two filtering apparatus each corresponding to FIG. 3 are used for the second and third stages, respectively. After water to be treated is passed through the filtering apparatus A on the first stage by the pump 3, it is passed through filtering chambers B and C on the second and third stages in order by natural flow due to the water head difference between head tanks 11. In this construction, water is passed through the three stages of the filtering apparatus only with one pump. The filtering apparatus A on the first stage is provided with two lines of feed pipes 4a and 4b both connected to a pump 3. The feed pipe 4b is used during the usual filtering operation. In the case that the feed pipe 4b is clogged by particles of filtering material when restarting the filtering operation, water is fed through the feed pipe 4a at first and then the feed line is changed over into the feed pipe 4b. Each of the filtering apparatus B and C on the second and third stages is provided with two lines of feed pipes 4a and 4b connected to the head tank 11. In each apparatus, the feed pipe 4b is used during the usual filtering operation and, in the case that the feed pipe 4b is clogged by particles of filtering material when restarting the filtering operation, water is fed through the feed pipe 4a because the water level in the head tank 11 ascends.

In this system, it is possible to omit any of the feed pipes 4a and 4b in the filtering apparatus A on the first stage. In the filtering apparatus A on the first stage, because the water to be treated is fed with the pressure by the pump 3, a higher hydraulic pressure can be obtained than in the second or third stage in which the water is fed from the head tanks 11. Thus, even when the feed pipe 4a is omitted and particles of filtering material enter into the feed pipe 4b to some extent, the particles of filtering material which have entered into the feed pipe 4b can be discharged with the higher hydraulic pressure. In the case of omitting the feed pipe 4b, even when the pressure loss in a gravel layer 6 or a porous plate 7 as a fixed bed is increased, the filtering operation can be continued without a washing operation because of the higher pressure by the pump 3.

FIG. 6 shows the second system construction, which is the same as the system construction of FIG. 5 in the feature that three stages of filtering apparatus are connected in series, but in which a filtering apparatus corresponding to FIG. 2 is used for the first stage and two filtering apparatus each corresponding to FIG. 4 are used for the second and third stages, respectively. In this embodiment, because an independent pump 3 is provided for feed pipe line 4a, it is possible directly to apply discharge pressure by the pump 3 onto the feed pipe line 4a when restarting the filtering operation after a suspension. As a result, the restart of the filtering operation becomes surer. Also in this embodiment, it is possible to omit any of the feed pipes 4a and 4b in the filtering apparatus A on the first stage like in the embodiment shown in FIG. 5.

FIG. 7 shows the third system construction, which is suitable for directly purifying a water area such as a corrupt lake, a corrupt marsh, a corrupt dam, a corrupt reservoir or the like. Also in this system, three stages of filtering apparatus A to C are connected in series like in the system of FIG. 5. This system is provided in a water area to be purified. The system may be floating on the water surface with a float or floats. Otherwise, it may directly be put on the bottom of the water area. Since the system can be provided in a water area to be purified, it is possible to shorten the feed course of water to be treated in comparison with a case that the system is provided on land. As a result, the power required for feeding water can be minimized. There is an effect of saving energy. In the embodiment of FIG. 7, two parallel filtering chambers are provided on each of the stages A to C and each of feed pipe lines 4a and 4b on each stage is divided into two so as to correspond to the filtering chambers. By this construction, since a uniform fluidized state in each of the filtering chamber units A to C can be obtained, a purifying operation with a good efficiency becomes possible. Especially, this construction is effective in the case of a large amount of water to be treated.

Figure 8:
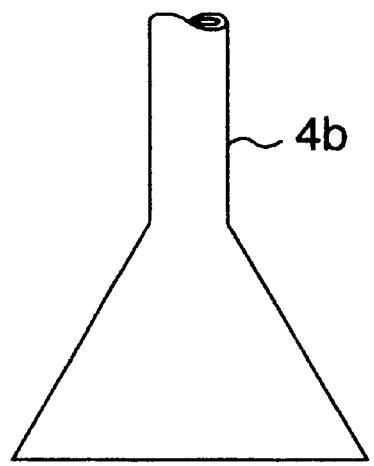
FIG. 8 is a side view of the outlet portion of a feed pipe used in the present invention.

FIG. 8 shows the shape near the outlet portion of a feed pipe 4b used in a fluidized bed filtering apparatus of the present invention.

When particles of filtering material enter into a feed pipe 4b the outlet of which opens in a filtering material layer, there is a case that the feed pipe 4b is clogged and it becomes hard to restart the filtering operation. For avoiding this trouble, a feed pipe 4b of FIG. 8 has a shape in that the flow section in the outlet portion flares toward the tip of the outlet portion. By this structure, even when particles of filtering material have entered into the feed pipe 4b to some extent, it is easy to discharge the particles of filtering material. By employing the structure of the outlet portion shown in FIG. 8, it becomes easy to restart the filtering operation.

Figure 9:
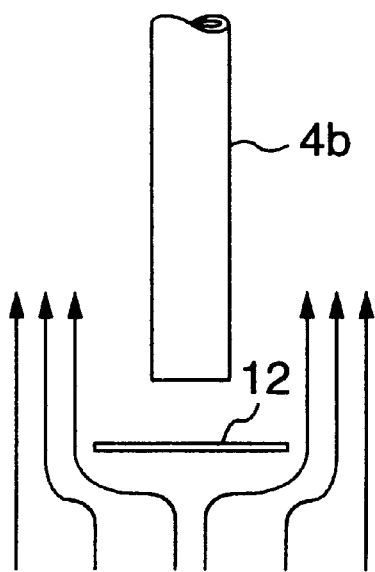
FIG. 9 is a side view of an arrangement near the outlet portion of another feed pipe used in the present invention.

FIG. 9 shows an arrangement near the outlet portion of a feed pipe 4b in a fluidized bed filtering apparatus for making particles of filtering material hard to enter into the feed pipe 4b.

In a fluidized bed filtering apparatus, when air is blown into a filtering chamber 1 through an air scattering tube 9 by a blower 8 to aerate the filtering chamber 1, there is a case that air bubbles enter into the feed pipe 4b to form a reverse flow in the feed pipe 4b and particles of filtering material are forcedly entered into the feed pipe 4b. Accordingly, in the arrangement of FIG. 9, an obstacle plate 12 for preventing filtering material from entering is provided below the outlet of the feed pipe 4b at a distance from the tip of the outlet portion. In this arrangement, when the filtering chamber 1 is aerated, air bubbles flow near the outlet portion of the feed pipe 4b as shown by arrows in FIG. 9, so that they do not enter into the feed pipe 4b. Thus, by employing this arrangement, it becomes possible to prevent filtering material from entering into the feed pipe 4b with an air flow, so that it becomes easier to restart the filtering operation.

Figure 10:
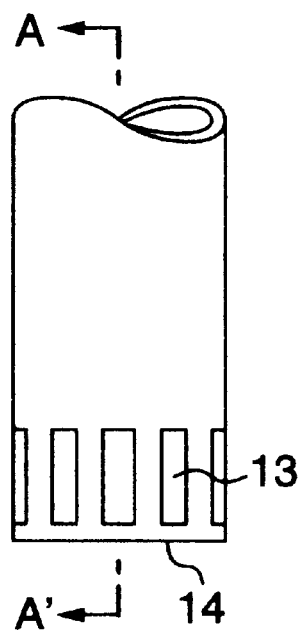
FIG. 10 is a side view of the outlet portion of still another feed pipe used in the present invention.
Figure 11:
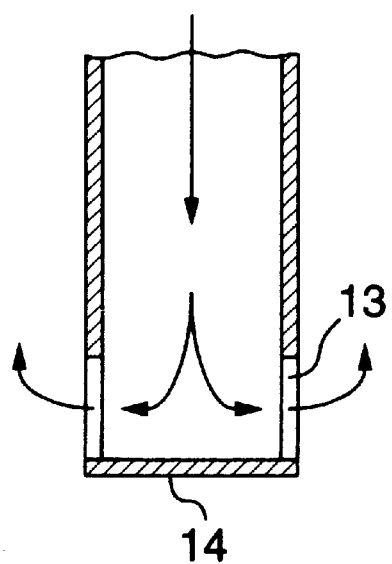
FIG. 11 is a cross-section taken along a line A–A' in FIG. 10.

FIGS. 10 and 11 show a structure near the outlet portion of a feed pipe 4b used in a fluidized bed filtering apparatus of the present invention, which differs from the structure of FIG. 8.

In this structure, the outlet portion of a feed pipe 4b is provided with slit holes 13 formed in the side wall (cylindrical portion) of the pipe and the tip of the outlet portion is closed with a closing plate 14. In this structure, water to be treated flows as shown by arrows in FIG. 11. Thus, when a filtering chamber 1 is aerated, air bubbles can be prevented from entering into the feed pipe 4b like in the arrangement of FIG. 9.

FIGS. 12A and 12B show a structure of the outlet portion of a feed pipe 4b used in a fluidized bed filtering apparatus of the present invention, which differs from the structure of FIG. 10.

In this structure, a reverse flow preventing member 15 made of soft material such as rubber, vinyl and fibers is attached to the tip of the outlet portion of a feed pipe 4b. During the usual filtering operation, since water is fed through the feed pipe 4b, the reverse flow preventing member 15 is expanded as shown in FIG. 12A. When the filtering operation is suspended, the reverse flow preventing member 15 is squashed by a surrounding hydraulic pressure as shown in FIG. 12B. As the result, the reverse flow preventing member 15 operates as a check valve for preventing a reverse flow of water or air from entering into the feed pipe 4b during a suspension of the filtering operation. Thus, particles of filtering material are prevented from entering into the feed pipe 4b.

For obtaining a similar effect, a reverse flow preventing portion 15 similar to that of FIGS. 12A and 12B may be provided in the middle of a feed pipe 4b or the whole of a feed pipe 4b may be made of soft material.

A fluidized bed filtering apparatus according to the present invention comprises a supporting layer disposed in a filtering chamber for supporting a filtering material layer made of granular filtering material and providing a space in the lower portion of the filtering chamber, a first feed pipe having an outlet within the space for feeding original water to be purified, and a second feed pipe having an outlet in the filtering material layer for feeding original water to be purified. Thus, even when particles of the filtering material enter into the second feed pipe to clog the second feed pipe, by feeding water into the filtering chamber through the first feed pipe, the filtering material layer can be fluidized and expanded and the flow resistance in the second feed pipe can be lowered to return to the usual filtering operation. Since water is passed through the supporting layer for supporting the filtering material layer only when restarting the filtering operation in general, the frequency of clogging in the supporting layer can be minimized.

In a multi-stage fluidized bed filtering apparatus in which plural filtering chambers are connected in series and water to be treated is passed through the plural filtering chambers in order, by the construction that the filtering chamber on the first stage is provided with a first feed pipe and each of the filtering chambers on and after the second stage is provided with two lines of first and second feed pipes for feeding corrupt water into the filtering chamber, there is an effect that it becomes easy to restart the filtering operations in the filtering chamber on or after the second stage into which it is impossible to apply a high pressure.

In an apparatus in which corrupt water is fed into a filtering chamber from a head tank disposed at a higher level than the filtering chamber and a second feed pipe is connected to the head tank at a lower level than a first feed pipe, when the second feed pipe is clogged by particles of filtering material, the water level in the head tank ascends and it becomes possible to feed water through the first feed pipe with a high hydraulic pressure, so that it becomes easy also to feed water through the second pipe. It is possible automatically to restart the filtering operation without any valve operation or the like.

In the case of a second feed pipe having a shape that the flow section in the outlet portion flares toward the tip of the outlet portion, even when particles of filtering material have entered into the second feed pipe to some extent, the particles of filtering material can easily be discharged when restarting of the filtering operation.

In the case of a second feed pipe in which the tip of its outlet portion is closed and slit holes for discharging water to be treated are formed in its side wall (cylindrical portion), or an arrangement in which a plate member is disposed below the outlet of a second pipe at a distance from the tip of the outlet portion of the second feed pipe, when a filtering chamber is aerated to wash the filtering members, air bubbles can be prevented from entering into the second feed pipe. Thus, since particles of filtering material can be prevented from entering into the second feed pipe with a reverse flow of air into the second feed pipe, the restart of the filtering operation becomes easier.

In the case of a second feed pipe a part or the whole of which is made of soft material so as to be squashed by a hydraulic pressure when suspending the filtering operation, the squashed portion of the pipe when suspending the filtering operation operates as a check valve to prevent water or air from forming a reverse flow into the second pipe. Thus, since particles of filtering material are prevented from entering into the second feed pipe, the restart of the filtering operation becomes easier.

By the manner that corrupt water is fed through a first feed pipe initially when restarting the filtering operation and then the line for feeding corrupt water is changed over into a second feed pipe, even when particles of filtering material enter into the second feed pipe to clog the second feed pipe, a filtering material layer can be expanded by feeding water through the first feed pipe and the flow resistance in the second feed pipe can be lowered, so that the restart of the filtering operation becomes easy.

In the case of a filtering chamber provided with air scattering means for washing a filtering material layer and a second feed pipe provided with a valve or a check valve, even when the filtering chamber is aerated by the air scattering means, there is an effect that air bubbles can be prevented from entering into the second feed pipe to form a reverse flow of air into the second feed pipe, so that particles of filtering material can be prevented from entering into the second feed pipe.

What is claimed is:

1. A fluidized bed filtering apparatus in which original water to be treated is passed upwardly through a filtering chamber filled with granular filtering material so that the granular filtering material is fluidized by the flow of the water and the water is purified, comprising a supporting layer disposed in said filtering chamber for supporting a filtering material layer made of said granular filtering material and providing a space in the lower portion of said filtering chamber, a first feed pipe having an outlet within said space for feeding the original water to be treated, a second feed pipe having an outlet in said filtering material layer for feeding the original water to be treated, a pump connected to said first feed pipe for forcedly feeding pressurized water into said space under said supporting layer, and a head tank connected to said second feed pipe for feeding the original water to be purified from said head tank into said filtering material by free fall with gravity.

2. A fluidized bed filtering apparatus according to claim 1, wherein said second feed pipe the outlet of which opens in said filtering material layer has a shape in that a flow section in an outlet portion flares toward a tip of said outlet portion.

3. A fluidized bed filtering apparatus according to claim 1, wherein said second feed pipe the outlet of which opens in said filtering material layer has a structure in that a tip of an outlet portion is closed and slits for discharging the water to be treated are formed in a wall of said second feed pipe in said outlet portion.

4. A fluidized bed filtering apparatus according to claim 1, wherein an obstacle plate for preventing filtering material from entering is provided below the outlet of said second feed pipe which opens in said filtering material layer.

5. A fluidized bed filtering apparatus according to claim 1, wherein at least a portion of said second feed pipe the outlet of which opens in said filtering material layer is made of soft material so that said portion of the soft material is squashed by a hydraulic pressure to close said second feed pipe at said portion when suspending filtering.

6. A fluidized bed filtering apparatus according to claim 1, wherein the water is fed through said first feed pipe initially when the filtering operation starts or restarts and then the feed pipe line is changed over so that the water is fed through said second feed pipe.

7. A fluidized bed filtering apparatus according to claim 1, wherein air scattering means for scattering air to wash said filtering material layer is provided within said space in said filtering chamber and said second feed pipe is provided with a valve or a check valve.

8. A fluidized bed filtering apparatus which includes a filtering chamber disposed at a higher level than the surface of an objective water area to be purified, filled with granular filtering material, and having an introducing portion for water to be treated and a draining portion for draining purified water, and a pump provided in the objective water area for taking the water to be treated for purification from the water area and feeding the water to the introducing portion of the filtering chamber and in which water to be treated is passed upwardly through the filtering chamber so that the granular filtering material is fluidized by the flow of the water and the water is purified, comprising a supporting layer disposed in said filtering chamber for supporting a filtering material layer made of said granular filtering material and providing a space in the lower portion of said filtering chamber, a first feed pipe having an outlet within said space for feeding original water to be purified, and a second feed pipe having an outlet in said filtering material layer for feeding the original water to be purified, so that water is fed into said filtering chamber through plural lines of feed pipes.

9. A fluidized bed filtering apparatus according to claim 8, wherein said filtering chamber is disposed so that its lower portion is submerged in said objective water area to be purified.

10. A fluidized bed filtering apparatus according to claim 8, wherein a feed pipe line for feeding the water to be treated into said filtering chamber is provided in the course thereof with means for exposing the water to the atmosphere.

11. A fluidized bed filtering apparatus according to claim 8, wherein separate feed water pumps are provided for said first and second feed pipes, respectively.

12. A fluidized bed filtering apparatus according to claim 11, wherein a first feed water pump of a high pressure and a little flow type is connected to said first feed pipe the outlet of which opens within said space formed under said supporting layer, and a second feed water pump of a lower pressure and a large flow type than said first feed water pump is connected to said second feed pipe the outlet of which opens in said filtering material layer.

13. A fluidized bed filtering apparatus according to claim 8, wherein a head tank is provided at a higher level than said filtering chamber, said first and second feed pipes are connected to said head tank so that the original water to be purified is fed from said head tank into said space and said filtering material layer by free fall with gravity, and the second feed pipe the outlet of which opens in said filtering material layer is connected to said head tank at a lower level than said first feed pipe the outlet of which opens within said space.

14. A fluidized bed filtering apparatus in which plural filtering chambers each filled with granular filtering material for passing water to be treated upwardly so that the granular filtering material is fluidized by the flow of the water and the water is purified are connected in series and the water to be treated is passed in order through the plural filtering chambers to be purified, wherein each of said filtering chambers is provided with a supporting layer for supporting a filtering material layer made of said granular filtering material and providing a space in the lower portion of said filtering chamber, the filtering chamber on a first stage is provided with a feed pipe having an outlet within said space, each of the filtering chambers on and after a second stage is provided with a feed pipe having an outlet within said space and another feed pipe having an outlet in said filtering material layer.

15. A fluidized bed filtering apparatus according to claim 14, wherein said filtering chamber on the first stage is also provided with another feed pipe having an outlet in said filtering material layer.

* * * * *